T. BILLINGTON.
SOIL BREAKER.
APPLICATION FILED SEPT. 19, 1918.

1,321,004.

Patented Nov. 4, 1919.
2 SHEETS—SHEET 1.

INVENTOR,
T. Billington
By T. D. Impham
HIS ATTORNEY.

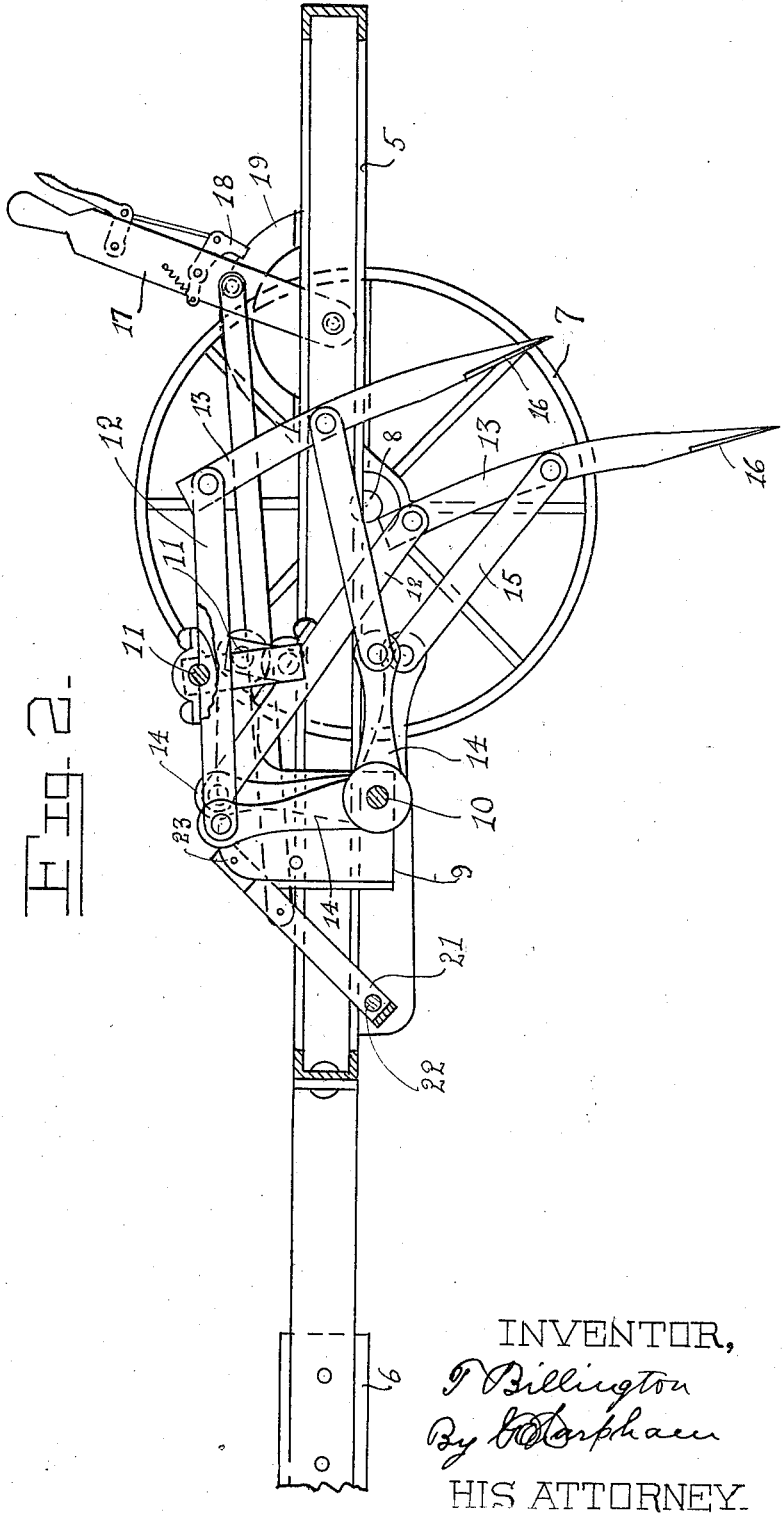

UNITED STATES PATENT OFFICE.

THEOPHILUS BILLINGTON, OF LOS ANGELES, CALIFORNIA, ASSIGNOR TO BILLINGTON COMPANY, OF LOS ANGELES, CALIFORNIA, A CORPORATION OF CALIFORNIA.

SOIL-BREAKER.

1,321,004.   Specification of Letters Patent.   Patented Nov. 4, 1919.

Application filed September 19, 1918. Serial No. 254,718.

*To all whom it may concern:*

Be it known that I, THEOPHILUS BILLINGTON, a citizen of the United States, residing at the city of Los Angeles, State of California, have invented new and useful Improvements in Soil-Breakers, of which the following is a specification.

My invention relates to an improved machine which punctures and breaks up the compact soil which forms below the usual plane of cultivation; and the object is to provide a simple and efficient machine which will aerate the soil, break up the hard soil, and thereby enable the crop roots to enter deeper into the soil than they can do where the lower strata is not broken or punctured and which will also enable the water to more deeply penetrate the soil than is usual with ordinary methods of cultivation.

In the drawings forming a part of my application:

Fig. 2 is a vertical, longitudinal section showing the right hand side of the machine, viewed from the rear, and two breaker blades and frames and the tongue.

Figure 1:
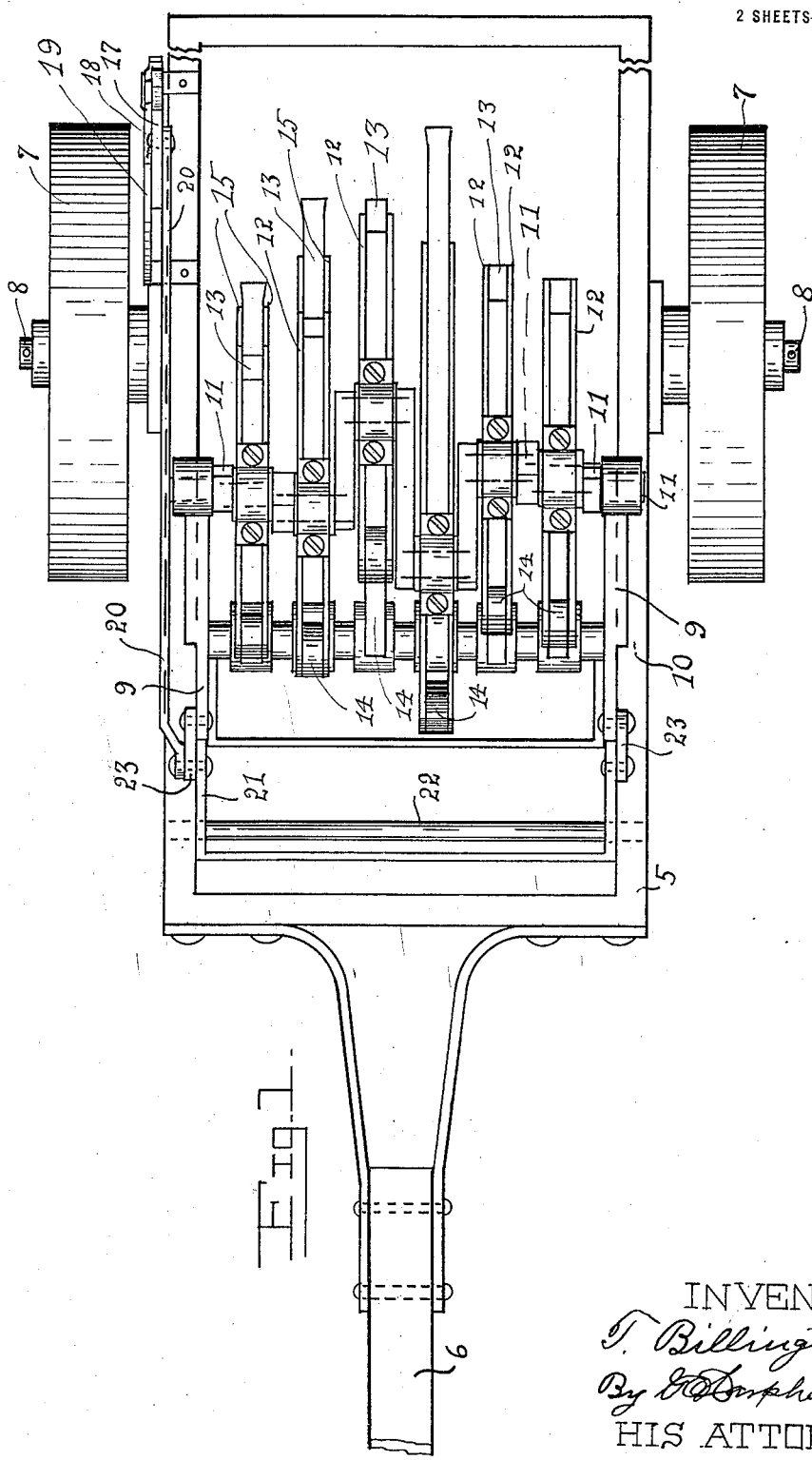
Figure 1 is a top plan of the machine provided with six breaker blades.

Referring to the drawings 5 is the main frame. A tongue 6 is secured to the front end when the machine is drawn by animals. When other power is used the tongue can be omitted. Wheels 7 are mounted on stub axles 8 secured to the frame. A U-shaped breaker frame 9 is rockably mounted on shaft 10 that is secured to the side members of frame 5. In the upper rear portion of frame 9 is mounted a crank 11 which may have three or more crank arms. I have shown six as I have found from practice that six is the most desirable number. Each crank arm carries a breaker blade bar 12 rockably mounted thereon, to the rear end of which is pivotally connected the upper end of the breaker blade shanks 13. The front ends of these breaker blade bars are pivotally connected to levers 14 which in the drawings are shown as bell cranks, but may be of other shape by altering the proportions of other parts. Each of the levers 14 is rockably mounted on shaft 10 and the other ends thereof are connected by link bars 15 with the shanks of the breaker blades as best illustrated in Fig. 2. The breaker blades 16 are removably connected to the lower ends of shanks 13, so that when dull they can be sharpened. A lever 17 is pivotally connected to one of the side members of the frame near the rear thereof as best shown in Fig. 2. This lever carries a pawl 18 which engages a ratchet 19 secured to the frame to hold the lever in its desired positions. A link bar 20 is pivotally secured to lever 17 and to a U-shaped regulating frame 21, which frame is mounted on a rod 22 secured to the side members of the frame near the rear end thereof. Links 23 connect frame 21 to frame 9.

In the operation of my machine, it is drawn through the field where it is desired to have the soil broken up: By means of the operating lever 17 and the pawl and ratchet, the depth to which the breaker blades are to penetrate the soil is regulated and the breaker blades may be positioned above the soil when desired. As the machine is drawn along, the breaker blades are successively drawn into and out of the soil. The point of entry of each of the breaker blades into the soil and exit therefrom is so close that the machine can be used in grain fields after the grain is up and in alfalfa and hay grasses without injury to the crop, and in orchards without injury to the roots of the trees. It will be observed that as the machine is drawn along and as the points of the breaker blades engage the soil they are forced down into and then out of the soil by the action of the crank arms, bars 12, levers 14, and links 15 and that while each breaker blade is penetrating the soil it is operating to rotate the crank and thereby carry the other breaker blades out of the soil and bring them again into engagement with the soil.

Having described my invention I claim:

1. A soil breaker comprising a main frame; stub axles secured to said frame; wheels revolubly mounted on said axles; a shaft extending transversely of said frame and mounted therein; a breaker frame rockably mounted on said shaft; a crank shaft revolubly mounted in said breaker frame, said shaft having a plurality of successively stepped arms; breaker blades operatively connected to said arms and to said transverse shaft; and means to position and hold positioned said breaker frame.

2. A soil breaker comprising a main frame; wheels mounted on said frame to carry and support the same; a shaft secured in the side members of said frame; a U-shaped breaker frame rockably mounted on said shaft; a crank having a plurality of arms revolubly mounted in said breaker frame; breaker blade bars mounted on said crank arms; breaker blades having shanks pivotally connected to said bars; bell crank levers rockably mounted on said shaft, the upper end of said levers being connected to said breaker blade shanks at the upper ends thereof; links connecting the lower ends of said levers; a rod mounted in the side members of the main frame; a U-shaped regulating frame mounted on said rod; a lever pivotally mounted on said main frame; a pawl secured thereto; a ratchet secured to said main frame and engaged by said pawl; a link connecting said lever to said regulating frame; and a link connecting said regulating frame to said breaker frame.

In witness that I claim the foregoing I have hereunto subscribed my name this 10th day of September, 1918.

T. BILLINGTON.

Copies of this patent may be obtained for five cents each, by addressing the "Commissioner of Patents, Washington, D. C."